(12) United States Patent
Alewine et al.

(10) Patent No.: US 10,171,322 B2
(45) Date of Patent: Jan. 1, 2019

(54) DYNAMIC AND SECURE CLOUD TO ON-PREMISE INTERACTION AND CONNECTION MANAGEMENT

(71) Applicant: International Business Machines Corporation, Armonk, NY (US)

(72) Inventors: Neal J. Alewine, Lake Worth, FL (US); Chih-Hsiung Liu, Taipei (TW); Barry Mosakowski, Raleigh, NC (US); Srinivasan Muralidharan, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 405 days.

(21) Appl. No.: 14/992,481

(22) Filed: Jan. 11, 2016

(65) Prior Publication Data
US 2017/0201509 A1     Jul. 13, 2017

(51) Int. Cl.
 *H04L 29/06* (2006.01)
 *H04L 12/26* (2006.01)

(52) U.S. Cl.
CPC ........ *H04L 43/0811* (2013.01); *H04L 63/029* (2013.01); *H04L 63/0272* (2013.01)

(58) Field of Classification Search
CPC . H04L 43/0811; H04L 63/0272; H04L 63/029
See application file for complete search history.

(56) References Cited

U.S. PATENT DOCUMENTS

| | | | | |
|---|---|---|---|---|
| 9,485,246 B2* | 11/2016 | Vepsalainen | .......... | H04L 9/3228 |
| 9,667,698 B2* | 5/2017 | Evans | .................. | H04L 67/06 |
| 9,774,586 B1* | 9/2017 | Roche | .................. | H04L 63/08 |
| 2013/0041931 A1* | 2/2013 | Brand | ..................... | H04L 67/10 |
| | | | | 709/203 |
| 2013/0142201 A1 | 6/2013 | Kim et al. | | |
| 2014/0082350 A1* | 3/2014 | Zarfoss, III | .......... | H04L 63/083 |
| | | | | 713/155 |
| 2014/0282821 A1* | 9/2014 | Adler | ..................... | H04L 63/10 |
| | | | | 726/1 |

(Continued)

OTHER PUBLICATIONS

Anonymously; "A method of Providing SSO Service Between on-premise Application and Public Cloud Service"; ip.com No. 000220208; Jul. 25, 2012; pp. 8.

(Continued)

*Primary Examiner* — Lynn D Feild
*Assistant Examiner* — Abdullah Alamamun
(74) *Attorney, Agent, or Firm* — Cantor Colburn LLP

(57) ABSTRACT

The described herein relates to a method executed by a passport service executed by at least one processor coupled to at least one memory. The method includes creating a passport on a cloud application that comprises connectivity details for a tunnel and activating an on-premise appliance of an on-premise system by delivering the passport to the on-premise appliance to build the tunnel. The method further includes generating a passport token via the passport, wherein the passport token comprises dynamically generated connectivity properties. The method also includes binding the cloud application and the on-premise appliance based on the dynamically generated connectivity properties of the passport token and the connectivity details of the passport.

17 Claims, 5 Drawing Sheets

(56) References Cited

U.S. PATENT DOCUMENTS

| | | | |
|---|---|---|---|
| 2014/0289791 A1 | 9/2014 | Acharya et al. | |
| 2014/0304804 A1 | 10/2014 | Lee et al. | |
| 2014/0317716 A1 | 10/2014 | Chao et al. | |
| 2015/0188922 A1 | 7/2015 | Parmar et al. | |
| 2015/0199161 A1* | 7/2015 | Gutnik | G06F 3/1296 358/1.15 |
| 2015/0326579 A1* | 11/2015 | Chandwani | H04L 63/0281 709/225 |
| 2016/0105424 A1* | 4/2016 | Logue | H04L 63/0823 726/7 |
| 2016/0105453 A1* | 4/2016 | Xue | H04L 43/10 726/23 |
| 2016/0294828 A1* | 10/2016 | Zakaria | H04W 4/70 |
| 2016/0308851 A1* | 10/2016 | Tiwari | H04L 63/0823 |

OTHER PUBLICATIONS

Anonymously; "A smarter Method to Develop and Install Langauge Pack for SaaS on Cloud and On-Premises Software"; ip.com No. 000240031; Dec. 24, 2014; pp. 9.

Anonymously; "Smart Virtual Appliance builder in Cloud Environment"; ip.com No. 000216926; Apr. 25, 2012; pp. 6.

* cited by examiner

DYNAMIC AND SECURE CLOUD TO ON-PREMISE INTERACTION AND CONNECTION MANAGEMENT

BACKGROUND

The present disclosure relates generally to dynamic and secure cloud to on-premise interactions and connections with minimal customer configuration.

Companies, such as those in the banking, insurance, and medical industries, generally treat customer data as highly confidential. This confidential customer data is stored within on-premise data systems to meet security and privacy concerns. Yet, in today's mobile market, access to the on-premise data systems can be achieved through off-premise mechanisms, such as cloud, mobile, and web-based applications.

However contemporary implementations of cloud, mobile, and web-based applications fail to provide secure, highly available, bi-directional connections to on-premise networks that can meet the same security and privacy concerns noted above. For example, existing virtual private network based solutions do not provide fine-grained access control or scalability for bi-directional connections. Further, current cloud-integration solutions require non-trivial steps to manually setup credentials among multiple systems for access from cloud applications, which add complexity in development, testing, and production.

In addition, an issue with the contemporary implementations is a requirement to open a demilitarized zone (DMZ) port so connections can be established from the cloud, mobile, and web-based applications to the on-premise data systems. Opening the DMZ port can be challenging (e.g., from a development point of view) and infeasible to many organizations (e.g., from a security point of view).

SUMMARY

The described herein relates to a method executed by a passport service executed by at least one processor coupled to at least one memory. The method includes creating a passport on a cloud application that comprises connectivity details for a tunnel and activating an on-premise appliance of an on-premise system by delivering the passport to the on-premise appliance to build the tunnel. The method further includes generating a passport token via the passport, wherein the passport token comprises dynamically generated connectivity properties. The method also includes binding the cloud application and the on-premise appliance based on the dynamically generated connectivity properties of the passport token and the connectivity details of the passport. The above method can be implemented in a system or computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter described herein is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
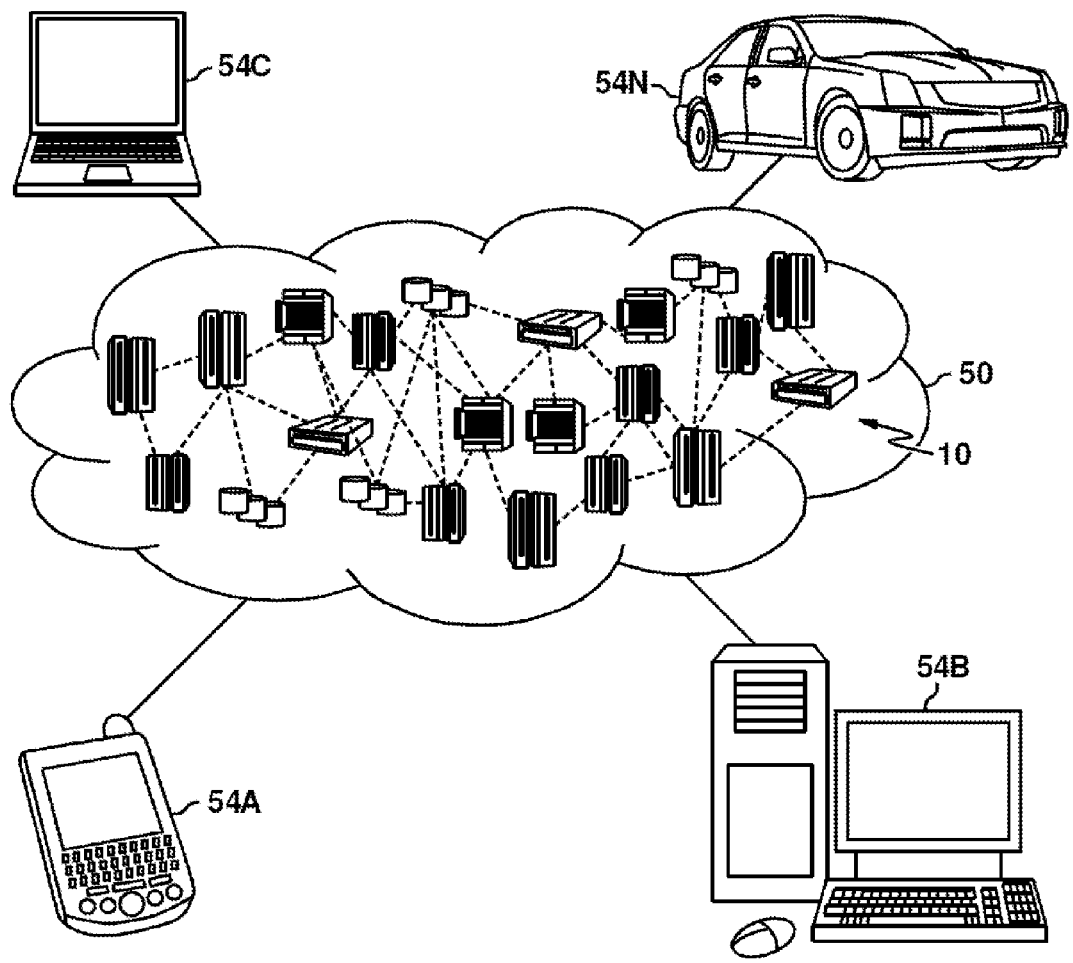
FIG. 1 depicts a cloud computing environment according to an embodiment.

A flexible and user consumable connectivity service is provided herein. The flexible and user consumable connectivity service simplifies a connection bridge between any two disparate systems, and thus can be used to connect off-premise applications and on-premise networks (e.g., cloud-to-cloud, DMZ-to-on-premise, or cloud-to-enterprise).

It is understood in advance that although this disclosure includes a detailed description on cloud computing, implementation of the teachings recited herein are not limited to a cloud computing environment. Rather, embodiments herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
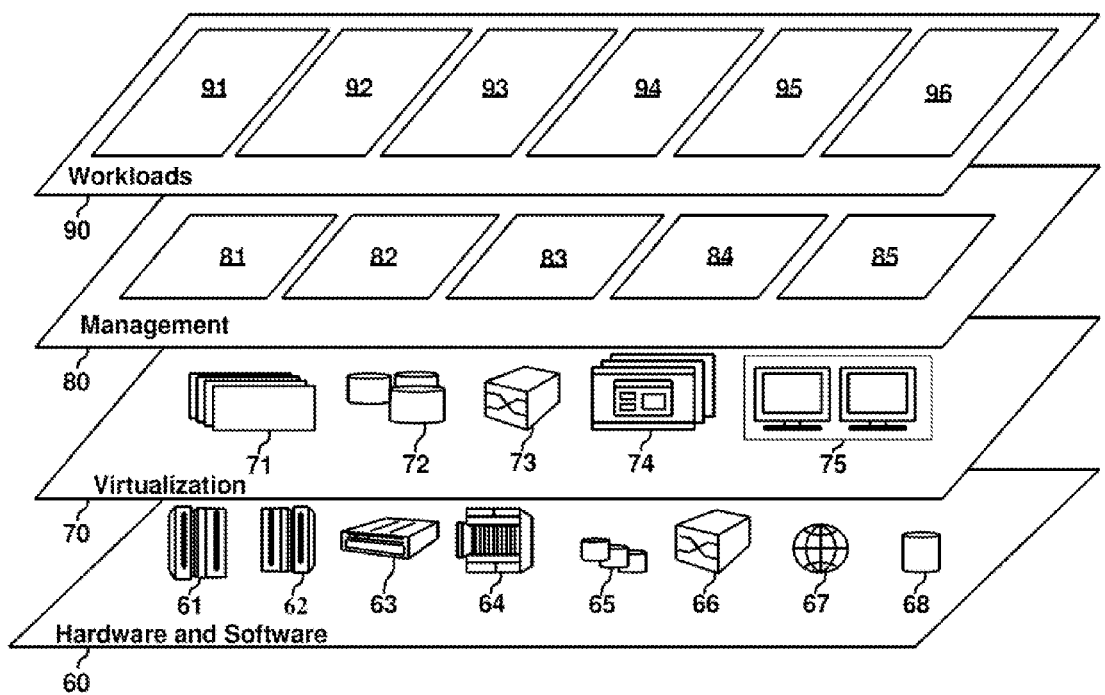
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments herein are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In view of the above, embodiments described herein relate to a flexible and user consumable connectivity service. The flexible and user consumable connectivity service can be an access mechanism of a system architecture that includes a connectivity library to simplify creation and management of cloud connectivity.

For example, the access mechanism can include a cloud application that accesses an on-premise appliance. An on-premise appliance is any computing device and/or software within an on-premise network that can be used to access enterprise applications. The access mechanism can create a passport on the cloud application that contains connectivity details. A passport can be software for generating security token (e.g., a passport token) used to provide secure communications. The connectivity details can include pre-allocated transmission control protocol (TCP) ports for tunnel setup. The passport can then be imported to the on-premise appliance to activate a management tunnel and data tunnel. A tunnel, in general, allows secure and direct access to data.

Further, a passport token is generated by the passport. That is, once a passport is created, the passport can be used to create one or more passport tokens. The passport token can allow passport owner to revoke an individual token without impact to other cloud applications. The passport token can enforce additional policies, such as expiry, data transfer limitation, etc. The cloud-allocated passport and passport token contain dynamically generated connectivity properties. Connectivity properties are communication credentials, such as address and port parameters, that support activation of on-premise appliances as a bridge between the cloud application and the on-premise appliance of the on-premise system. Thus, the passport token can be passed to a cloud application developer to access passport service.

In an embodiment the passport token is passed to a passport library along with internet protocol (IP) addresses of on-premise systems. The passport library interacts with a passport service to enable/disable connectivity settings. The passport library accepts passport tokens and connectivity parameters (e.g. static connections and/or dynamic connections) as input, and returns a binding IP/Port that the cloud application can connect to. When the cloud application requests a dynamic connection, the passport library passes the passport token to passport service, which then creates required connection to on-premise applications. In this way, the passport library act as a key interface managing communication details for the passport services.

The passport service can be a cloud-based service that provides a connectivity service. The passport service can be used to create the passport or plurality thereof and manage a passport life cycle. The passport, when created by the passport service, contains a set of pre-allocated connectivity information (e.g. management port and data port).

The passport library can also take the passport token as a parameter to identify which on-premise appliance to connect to. The passport library also returns a binding IP port to the cloud application to allow the cloud application to communicate with any desired system of the on-premise system. For example, the passport library can take a desired IP/Port of an on-premise system as input parameter and return a temporary set of IP/Ports as a delegate on the cloud application.

Figure 3:
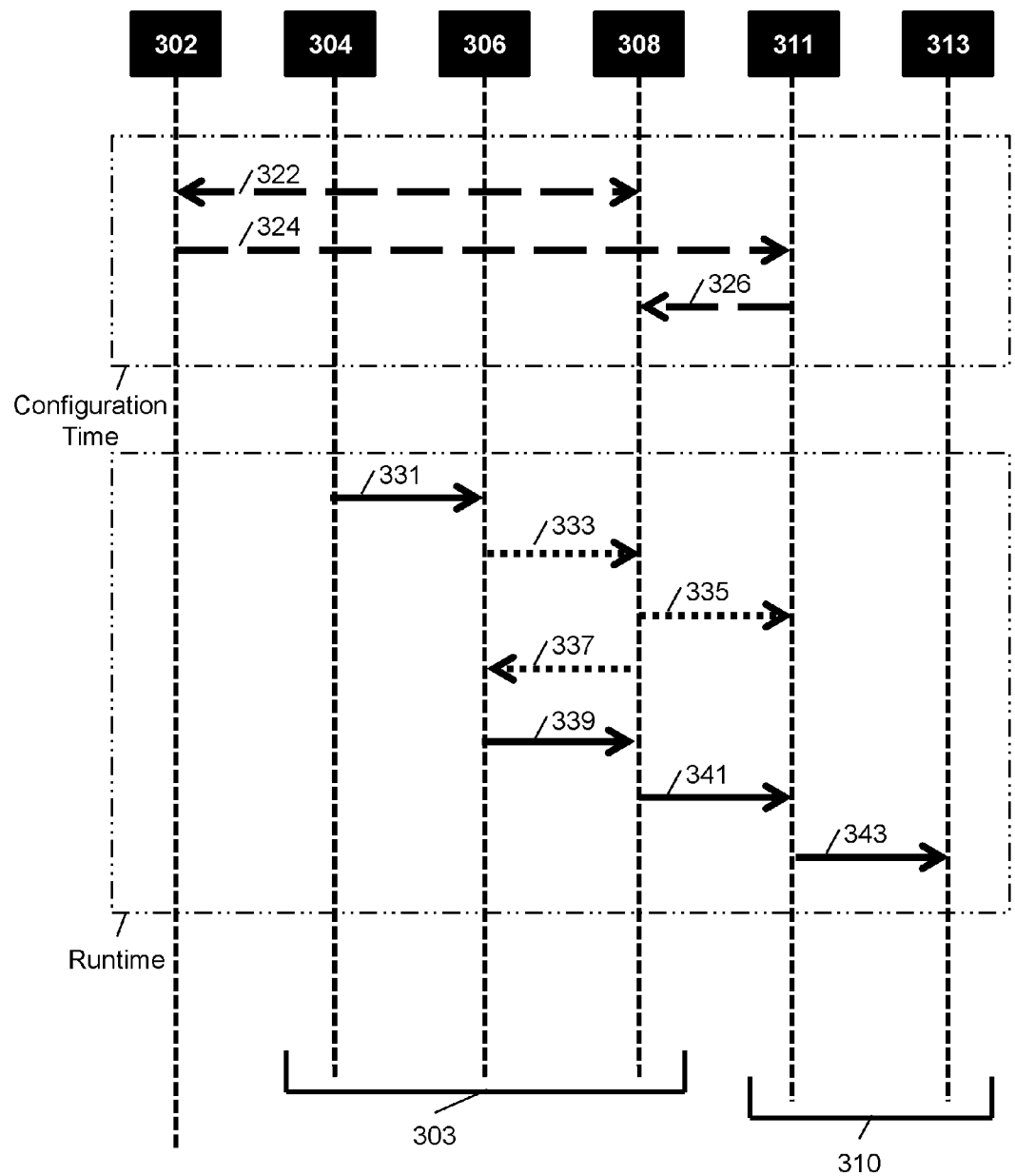
FIG. 3 depicts communication schematic for establishing a dynamic connection in accordance with an embodiment.

Turning now to FIG. 3, a communication schematic 300 for establishing a dynamic connection is generally shown in accordance with an embodiment. The communication schematic 300 includes a user 302 who connects to elements of a cloud 303. The cloud 303 includes a cloud application 304, a passport library 306, and a passport service 308. The user 302 further connects to elements of an on-premise network 310. The on-premise network 310 includes a passport appliance 311 and an enterprise application 313.

In operation, the elements of the communication schematic 300 communicate during a configuration time. The configuration time begins as arrow 322 where the user 302 and/or the passport service 308 create a passport. This passport is related to the enterprise application 313. At long-dashed arrow 324, the passport appliance 311 imports the passport from the user 302 (and/or through the cloud). This can be considered an activation of the passport appliance 311. Note that long-dashed arrows 322 and 324 can be driven by the user 302.

As shown, the passport appliance 311 is located at the on-premise network 310 (e.g., a user's private network). A configuration property of the passport appliance 311 is "passport" identification. The user 302 can "activate" the passport appliance 311 by configuring the passport identification to the passport appliance 311. Once the passport appliance is activated with the passport, the passport service 308 can use a management port to control the passport appliance 311 to setup additional connections to the enterprise application 313 and other on-premise applications. As shown at arrow 326, a secure tunnel (e.g., data and management channel) is established between the cloud 303 and the on-premise network 310 (e.g., established between the passport service 308 and the passport appliance 311).

At long-dashed arrow 326, a secure tunnel (e.g., data and/or management channel(s)) is established between the cloud 303 and the on-premise network 310 (e.g., established between the passport service 308 and the passport appliance 311).

In an embodiment, since the passport is related to the enterprise application 313, the passport can be used to identify and access the on-premise network 310 where the passport appliance 311 located. Further, with the passport identification, the passport appliance 311 can get the connectivity details of the passport from passport service 308 (e.g., the hostname of the passport service 308). Using the connectivity details, the passport appliance 311 can establish two secure connections from the on-premise network 310 to the cloud 303. A first connection can be a management tunnel, and a second connection can be a data tunnel. One advantage of this approach is that there is no need for information technology administrator to enable certain port on DMZ for this service to work.

In an embodiment, the secure tunnel can support use secure shell remote port forwarding, where the remote port is allocated when passport is created and the passport appliance 311 knows which remote port to establish a remote port forwarding connection.

In another operation, the elements of the communication schematic 300 communicate during a runtime. In general, the user 302 originates and/or causes the sending of a data request to the enterprise application 313 using target addresses and ports as parameters. In turn, at arrow 33, the cloud application 304 communicates the data request to the passport library 306. The data request can include the passport created with respect to arrow 322, a targetIP, and a targetPort (e.g., Data Request (passport, targetIP, targetPort)).

Figure 4:
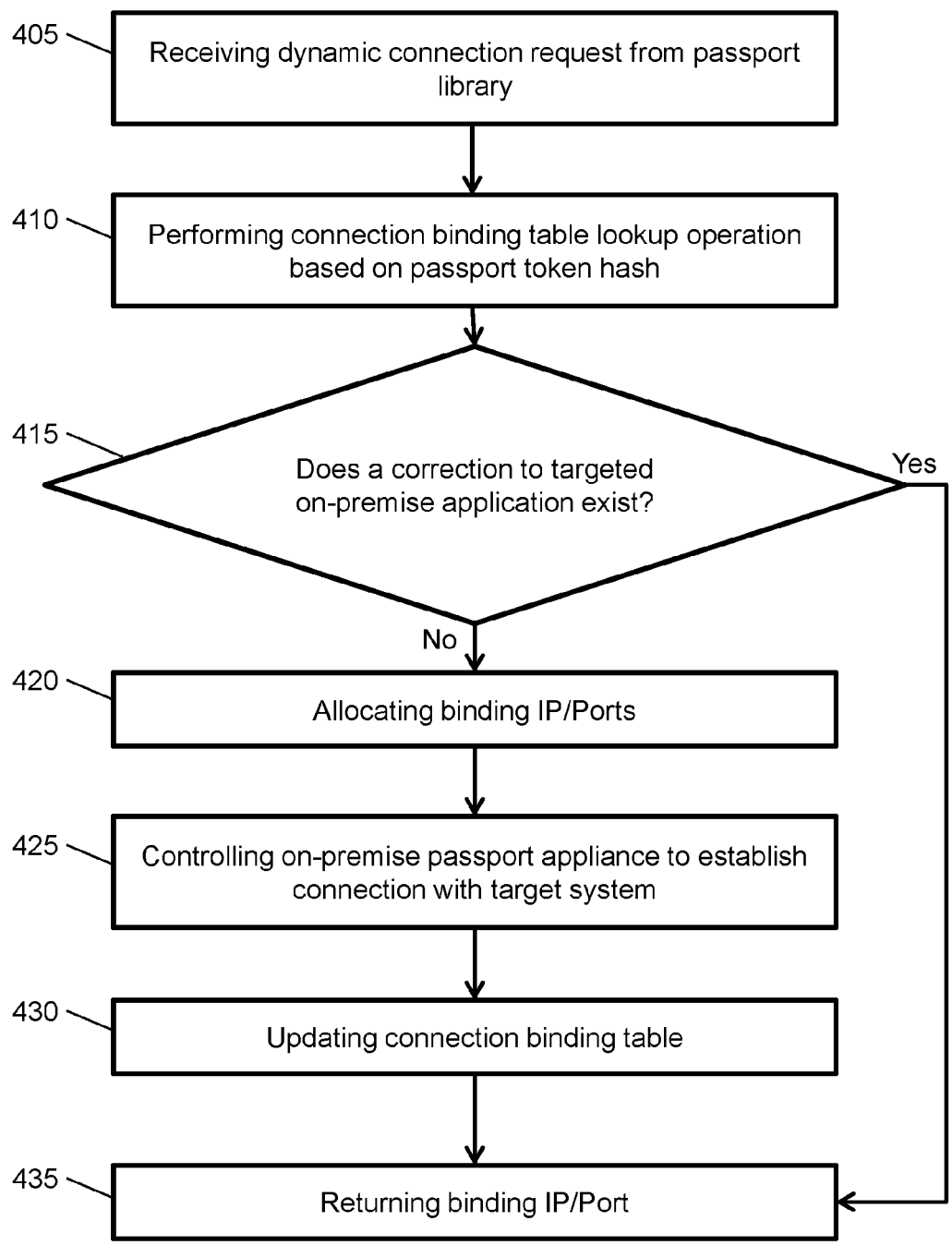
FIG. 4 depicts a process flow for dynamic connection building in accordance with an embodiment.

In response to the data request from the cloud application 304, the passport library 306 finds that a connection binding is not available. The passport library 306, at dotted arrow 333, requests the passport service 308 to create a tunnel, such as by sending a dynamic connection request. Turning now to FIG. 4, a process flow 400 for dynamic connection building is depicted in accordance with an embodiment.

The process flow 400 begins at block 405, where a dynamic connection request from passport library 306 is received (e.g., by the passport service 308). At block 410, a lookup operation with respect to a connection binding table is performed (e.g., by the passport service 308) based on a hash of a passport token. A connection binding table tracks all connections associated with one passport (e.g., all connection binding information associated with the passport can be stored in the connection binding table). Note that some of the connection bindings can be statically configured in a configuration interface of the passport service 308 and some connection bindings can be established dynamically by the enterprise application 313 using the passport library 306. At decision block 415, the passport service 308 determines whether a correction to targeted on-premise application exists.

As shown in the process flow 400 with respect to the 'No' arrow from block 415 to block 435, an allocation of binding IP/Ports is performed when the correction does not exist. Returning to FIG. 3, the passport service 308, at dotted arrow 335, communicates with the passport appliance 311 to create the tunnel. Through this tunnel, the on-premise appliance 311 is controlled to establish connection with the enterprise application 313. As shown in block 425 of FIG. 4, an on-premise passport appliance is controlled to establish connection with a target system. In turn, the connection binding table is updated at block 430 and the process flow 400 proceeds to block 435.

At block 435, the binding IP/Port is returned. Returning to FIG. 3, the passport service 308, at dotted arrow 337, then returns an address and port of the tunnel (e.g., Return (bindingIP, bindingPort)). Also, as shown in the process flow 400 with respect to the 'Yes' arrow from block 415 to block 435, the binding IP/Port can be returned to when the correction exists.

The passport library 306 then causes and/or originates the forwarding of the data request to the tunnel, based on the address and the port (e.g., bindingIP, bindingPort) until the target address and the target port (e.g., targetIP, targetPort) are accessed at the enterprise application 313. The forwarding of the data request is represented by arrows 339, 341, and 342.

Figure 5:
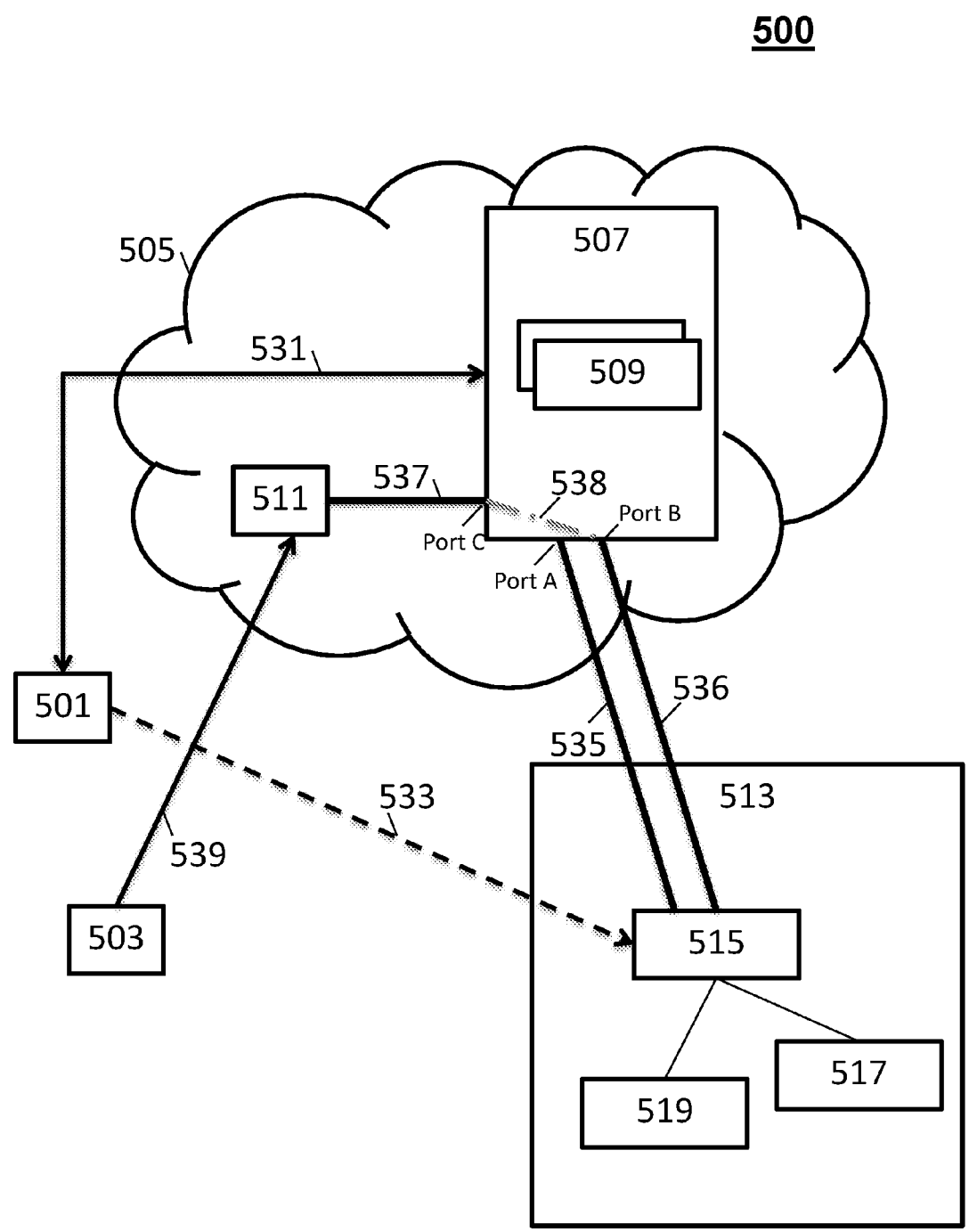
FIG. 5 depicts a hybrid cloud system including passport integration in accordance with an embodiment.

FIG. 5 depicts a hybrid cloud system 500 including a passport integration in accordance with an embodiment. The hybrid cloud system 500 includes a user 501 a mobile device 503, and a cloud 505. The cloud includes a passport service 507, a passport 509 or plurality thereof, a cloud application 511 (e.g., faces.tap.com). The hybrid cloud system 500 also includes an on-premise network 513. The on-premise network 513 includes an on-premise passport appliance 515 that supports connections to on-premise applications 517 and 519.

In operation, a user 501 (e.g., an application developer) accesses the passport service 507 to create a passport 509 (e.g., bmpass_01) at arrow 531. The passport allocates a Port A (e.g., "9999") for a management tunnel and a Port B (e.g., "8888") for a data tunnel. A passport token (bmpass_tk_123) is created for the passport 509 and passed to the user 501.

At dashed arrow 533, the user 501 activates the on-premise passport appliance 515 with the passport 509. The on-premise passport appliance 515 retrieves the connectivity information of the passport 509 from passport service 507. The management tunnel 535 is established to Port A (e.g., remote port 9999), and the data tunnel is established to Port B (e.g., remote port 8888) with the passport service 507.

To access the on-premise systems of the on-premise network 513 (e.g., faces.tap.com:80 of the on-premise application 517), the user 501 can pass the passport token to a passport library in the cloud application 511. The passport library calculates a hash value based on the passport token and an identification of the user 501. The passport library passes the hash value to the passport service 507 along with a target IP/port (e.g., faces.tap.com:80).

When the passport service 507 checks a connection binding table and determines that a connection to the target IP/port does not exist, the passport service 507 controls the on-premise passport appliance 515 to create a connection 537 to the cloud application 511 and binds 538 the connection 537 to the data tunnel 536 via a Port C (e.g., a local port "7777" of the passport service 507). The passport services 507 can return an address and the Port C to the cloud application 511, which the mobile device 503 uses to access the on-premise application 517 and/or data associated with the application.

Technical effects and benefits include providing a flexible and user consumable connectivity service that simplifies a connection bridge between any two disparate systems. Thus, embodiments described herein are necessarily rooted in cloud architecture to perform proactive operations to overcome problems specifically arising in the realm of storing confidential customer data. For example, while contemporary implementation focus on how to encapsulate a packet and dispatch data to a consumer on the cloud, embodiments herein relate to how a user on the cloud could establish the connection from cloud to on-premise even without a public available port on on-premise DMZs. In this way, embodiments herein do not require manipulation to network packets and can leverage a higher layer of connectivity service by using the concept of passport and the associated access token to manage the connectivity.

Also, for example, embodiments herein do not require a programming model and do not provide a messaging framework. That is, embodiments herein relate to how two endpoints could be connected at TCP level and provide a layer of abstraction for a user to easily setup a secure connectivity without having to deal of the IP/port of the system in the middle.

The embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method executed by a passport service executed by at least one processor coupled to at least one memory, comprising:

creating a passport on a cloud application that comprises connectivity details for a tunnel, the connectivity details including pre-allocated transmission control protocol ports for a setup of the tunnel, the tunnel securing and directing access by the cloud application to data of an on-premise appliance;

activating the on-premise appliance of an on-premise system by delivering the passport to the on-premise appliance to build the tunnel;

generating a passport token via the passport, wherein the passport token comprises dynamically generated connectivity properties for secure communications; and binding the cloud application and the on-premise appliance based on the dynamically generated connectivity properties of the passport token and the connectivity details of the passport.

2. The method of claim 1, wherein the tunnel activates a management tunnel and data tunnel.

3. The method of claim 1, wherein the passport token enables a revocation of an individual token without impact to subsequent cloud applications.

4. The method of claim 1, wherein the passport token is passed to a passport library along with internet protocol addresses of the on-premise appliance.

5. The method of claim 1, wherein the passport service acquires the passport token from a passport library when the passport service receives from the cloud application a request for a dynamic connection.

6. The method of claim 1, wherein the binding of the cloud application and the on-premise appliance includes creating a bridge between a first port of the passport service to a second port of the passport service.

7. The method of claim 6, wherein the first port connects to the cloud application.

8. The method of claim 6, wherein the second port connects to the tunnel.

9. A computer program product for a passport service, the computer program product comprising a computer readable storage medium having program instructions embodied therewith, the program instructions executable by a processor to cause the processor to perform:
- creating a passport on a cloud application that comprises connectivity details for a tunnel, the connectivity details including pre-allocated transmission control protocol ports for a setup of the tunnel, the tunnel securing and directing access by the cloud application to data of an on-premise appliance;
- activating the on-premise appliance of an on-premise system by delivering the passport to the on-premise appliance to build the tunnel;
- generating a passport token via the passport, wherein the passport token comprises dynamically generated connectivity properties for secure communications; and
- binding the cloud application and the on-premise appliance based on the dynamically generated connectivity properties of the passport token and the connectivity details of the passport.

10. The computer program product of claim 9, wherein the tunnel activates a management tunnel and data tunnel.

11. The computer program product of claim 9, wherein the passport token enables a revocation of an individual token without impact to subsequent cloud applications.

12. The computer program product of claim 9, wherein the passport token is passed to a passport library along with internet protocol addresses of the on-premise appliance.

13. The computer program product of claim 9, wherein the passport service acquires the passport token from a passport library when the passport service receives from the cloud application a request for a dynamic connection.

14. The computer program product of claim 9, wherein the binding of the cloud application and the on-premise appliance includes creating a bridge between a first port of the passport service to a second port of the passport service.

15. The computer program product of claim 14, wherein the first port connects to the cloud application.

16. The computer program product of claim 14, wherein the second port connects to the tunnel.

17. A system, comprising:
- a memory having computer readable instructions; and
- a processor for executing the computer readable instructions for a passport service, the computer readable instructions causing the processor to perform:
- creating a passport on a cloud application that comprises connectivity details for a tunnel, the connectivity details including pre-allocated transmission control protocol ports for a setup of the tunnel, the tunnel securing and directing access by the cloud application to data of an on-premise appliance;
- activating the on-premise appliance of an on-premise system by delivering the passport to the on-premise appliance to build the tunnel;
- generating a passport token via the passport, wherein the passport token comprises dynamically generated connectivity properties for secure communications; and
- binding the cloud application and the on-premise appliance based on the dynamically generated connectivity properties of the passport token and the connectivity details of the passport.

* * * * *